3,485,636
HIGH PROTEIN FOOD
Harold A. Hoffman, 105 Bayeau Road,
New Rochelle, N.Y. 10804
No Drawing. Filed Feb. 7, 1966, Ser. No. 525,359
Int. Cl. A23j 1/14
U.S. Cl. 99—17      4 Claims

ABSTRACT OF THE DISCLOSURE

A foodstuff of improved taste and consistency is prepared by impregnating soybean meal with an edible oleaginous material and cooking the resulting material in boiling water.

---

This invention relates to food. More particularly, it is directed to an improved vegetable protein composition for use in human alimentation.

Acute hunger or starvation is both a physical and psychological cataclysm against which the individual violently reacts. All of his resources quickly concentrate on finding food at the expense of his other functions and values. This state of highly magnified nervous excitement, irritability and even sensorial exaltation is rapidly followed by apathy, depression, nausea and inability to concentrate. Such periodic ups and downs succeed each other irregularly, while the body progresses inexorably to wasting edema and death.

Chronic hunger, however, is less spectacular than starvation. It is induced by under-nutrition and/or malnutrition; and its effects are often prolonged and persistent. It has been recently reported by the FAO (Food and Agricultural Organization of the United Nations), that 60% of the people of the developing countries are undernourished; that 50% of the infants born into the world die before the age of six because of malnutrition (death is due to intercurrent infections to which malnutrition has made them very susceptible); and that of those who survive infection, 10 to 25% are physically or mentally retarded. Malnutrition, however, is not confined to the developing countries. It exists throughout the world, even in affluent societies.

Chronic hunger (often called hidden hunger because it is usually not recognized as such by its sufferers), is due primarily to the lack of nutritional material, such as protein, fat, carbohydrates and adequate supplements of vitamin and minerals in the diet. The lack of sufficient protein is the major source of malnutrition in those societies where it occurs. These usually occur in combination, but each lack produces its own subsequent clinical manifestation.

As has been stated, the most widespread and serious of these hidden hungers is protein deficiency. Protein is characteristic of life, and is an essential component in the structure of protoplasm. Without it there is no life. With insufficient protein life may go on, but at a level far below its potential.

Adequate protein must be available to the human, both in the quantity to meet the minimum daily requirements (MDR), for each age level, and in respect of its biological efficiency. Therefore, there must be present in protein a quantity thereof which is available as a completely biologically efficient protein. In short, it is not the total quantity of protein ingested which counts. Rather, it is the protein therein which furnishes the MDR of the proper kind of protein, i.e., the protein which is completely utilized by the body.

Plant, i.e., vegetable protein, can provide means for overcoming the lack of protein in the diet. However, various forms of vegetable protein which have heretofore been proposed for use in human alimentation lack certain important characteristics.

The human derives psychological satisfaction in chewing. In addition to such psychological satisfaction, mastication is a necessary function for activity of the salivary glands and maintenance of adequate dentition. Most of the vegetable protein products heretofore proposed are eaten in the form of mushes and gruels, or powdered supplements added to the staple diets which are usually high in carbohydrate, but deficient in protein. Some peoples, however, decline to accept such supplements, preferring their customary sources of foods (rice, beans, the pastas—which provide carbohydrate but are deficient in protein), served in their traditional fashion.

I have now found that it is possible to provide compositions based on vegetable proteins which approach flesh meats in physical structure and taste, so that they can be chewed with all the advantages arising from their masticability and nutritional efficiency.

In seeking a source of protein that would provide the requisite protein foundation for such a protein-based product, it occurred to me that a material heretofore used for animal feeding might serve such purpose.

I was aware that a feed material derived from soybeans, peanuts, etc., as described in U.S. Patent No. 2,162,729, was a relatively hard, horny substance. It was not only too hard for chewing, but unpalatable for human use.

As taught in U.S. Patent No. 2,162,729, that feed material was manufactured by subjecting solvent-extracted soybean meal (or related meals), containing some moisture, to a pressure ranging from 2,000 to 5,000 pounds per square inch, for a time and at a temperature sufficient to convert the moisture into steam, whereby the meal was disembittered. This product, when removed from the heated press, as described herein, was hard and horny. It could be fragmented into pieces of desired size.

It occurred to me that if it were possible to cook the pieces and to maintain the form thereof even though they were hydrated, without disintegration, and furthermore to include therewith additional nutrients as well as flavor-imparting substances, the resultant product might possess requisite nutritional properties, coupled with desirable palatability and chewability.

I sought for means whereby I could delay the rate of hydration of the pieces during the cooking operation, so as to maintain the solid form thereof, but softened adequately to provide chewability. I found that by impregnating the pieces with an edible oil or liquefied fat (hereinafter referred to as fatty or oleaginous material), I obtained a product which, when cooked with water, underwent slow hydration and emerged in chewable chunks, having the general shape of the starting pieces but of increased volume (2- or 3-fold). The chunks, surprisingly, did not disintegrate into a mush or gruel.

I further found that I could include along with cooking water, hydrolyzed vegetable protein, some salt, carmelized sugar, and monosodium glutamate to obtain chunks which were markedly palatable, readily chewable, and of noticeably attractive appearance—resembling chunks of roasted or braised beef.

In my continued investigations I also found that the dry pieces (although fat or oil-impregnated), when admixed with water in which was distributed hydrolyzed vegetable protein, salt, caramelized sugar, monosodium glutamate, or any other supplementary nutritional materials, could be filled into cans; sealed hermetically, and heated under pressure (with simultaneous preservation by sterilization), to effect conversion into the above described palatable chunks. Thus, a notably valuable food was made available that could be stored for prolonged periods of time (the same as other canned foods); and could be eaten either cold upon removal from the can, or upon heating—depending upon the preference of the consumer.

These palatable chunks may be admixed readily with high carbohydrate staple foods to provide a diet of requisite protein levels in lieu of the supplementation with protein powders, gruels, etc., which many peoples refuse to use.

I further found that the dry, fat-impregnated pieces could be admixed with hydrolyzed vegetable protein powder, salt, powdered caramelized sugar, and powdered monosodium glutamate; and that such admixture could be put up either in bulk packages, or institutional or individual consumer sizes. In consequence thereof, measured amounts of the dry product can be cooked with the requisite quantities of water to produce the read-to-eat food. Accordingly, the dry product can be bulk-processed in a cannery, to produce the cans above described—or simply cooked in a pot by the consumer to be eaten upon preparation.

I have found that any edible oleaginous material, i.e., edible oils or edible fats in liquid form may be used to provide the oleaginous impregnant. I prefer, however, to use coconut oil (melting point 76° F.) for that purpose, particularly because of its stability.

Accordingly, it is one of the principal objects of this invention to provide a novel, highly nutritious food product based on vegetable protein.

A further object is to provide such food in a variety of forms, ranging from one that is ready-for-cooking with water, to one that is ready-to-eat (cold or heatable).

The proportions of the components of this new product are as follows:

A NON-HYDRATED PRODUCT

|  | Suitable range (parts) | Preferred (parts) |
| --- | --- | --- |
| Toasted, debittered soy meal | 50–75 | 63 |
| Oleaginous material | 12–30 | 24 |

To such product there is added:

| | Parts |
| --- | --- |
| Hydrolyzed vegetable protein | 7.0 |
| Salt | 1.3 |
| Caramelized sugar | 2.25 |
| Sugar | 1.3 |
| Monosodium glutamate | 1.0 |

A HYDRATED PRODUCT

When the hydrated product is canned, the proportions of the components of the canned product is as follows:

|  | Suitable range (parts) | Preferred (parts) |
| --- | --- | --- |
| Toasted, debittered soy meal | 10–30 | 25 |
| Oleaginous material | 4–12 | 9 |
| Water | 35–80 | 61 |

To such product there is added:

| | Parts |
| --- | --- |
| Hydrolyzed vegetable protein | 3.0 |
| Salt | 0.5 |
| Caramelized sugar | 0.9 |
| Sugar | 0.5 |
| Monosodium glutamate | 0.4 |

The following are examples in accordance with this invention:

EXAMPLE 1

The pressed cake of disembittered (debittered) solvent-extracted soybean meal prepared as described in U.S. Patent No. 2,162,729, is broken into pieces. Although the pieces may vary in size from 2 grams to 500 grams, I prefer pieces varying in size from that of a hazelnut to a walnut.

100 kilos of the pieces are placed in a vessel to which is then added 36 kilos of liquefied 76° F. coconut oil, held at a temperature of 120–180° F. The mass is tumbled until the pieces become completely impregnated by the coconut oil. The impregnated pieces have an almost dry appearance. Then there is added to the mass the following mixture:

| | Kilos |
| --- | --- |
| Hydrolyzed vegetable protein | 12 |
| Salt | 2 |
| Caramelized sugar | 3 |
| Sugar | 2 |
| Monosodium glutamate | 1.6 |

The fat-impregnated pieces and the mixture just described are further tumbled until the mass acquires a uniform color, which is indicative of uniform distribution of the added material to the coated pieces.

The mass is then added to 245 kilos of water and boiled for 30 minutes. The mass is then filled into cans in accordance with conventional canning procedures, and the cans sterilized.

EXAMPLE 2

A dry formulation has the following composition:

| | Kilos |
| --- | --- |
| Toasted disembittered (debittered) soy meal | 64 |
| 76° F. coconut oil | 23 |
| Hydrolyzed vegetable protein | 8 |
| Salt | 1.3 |
| Caramelized sugar | 2.25 |
| Sugar | 1.3 |
| Monosodium glutamate | 1.08 |

The foregoing ingredients are combined as described in Example 1, and packaged in containers of various sizes. The packaged product can be cooked with water as described above.

The amount of the oleaginous material and/or water, in any of the products above described, can be varied from that mentioned above—so as to produce a product of desired consistency. Thus, it is possible to produce a range of products extending from one virtually devoid of free liquid, to one which consists of the chunks in a gravy-like medium containing part of the vegetable protein hydrolyzate, salt, caramelized sugar, monosodium glutamate, etc. The quantity and the character of the medium depends upon the quantities of the fat and the water fractions thereof.

It will be apparent from the foregoing that a valuable protein food now has become available; and that such food is prepared by:

(a) Impregnating, preferably completely, i.e., to saturation, pieces of the pressed cake (described above), with an edible oleaginous material, preferably coconut oil; and (b) Effectuating the hydration of the impregnated pieces by cooking them with water (whereby they absorb water), in the presence of additional nutritional and, optionally, flavoring materials, to satisfy the pallates of consumers, with resultant production of chunks of a food which approaches flesh meats in structure and taste—such as chunks of roasted or braised meats.

It will be understood that the foregoing description of the invention and the examples set forth are merely illustrative of the principles thereof. Accordingly, the appended claims are to be construed as defining the invention within the full spirit and scope thereof.

I claim:
1. A method of preparing an improved food product for use in human alimentation which consists essentially in the steps of:
   (a) impregnating solvent extracted soybean meal pieces with an edible oleaginous material at a temperature of about 120–180° F., and

(b) heating the oleaginous impregnated soybean meal pieces in boiling water for about thirty minutes, whereby the resulting product emerges in chewable chunks having the general shape of the starting material and a two to three fold increased volume.

2. A process according to claim 1 wherein the solvent extracted soybean meal is debittered.

3. A process according to claim 1 or 2 wherein the edible oleaginous material is coconut oil.

4. A process according to claim 1 or 2 where there is added to the water prior to boiling at least one of: hydrolyzed vegetable proteins, caramelized sugar, salt and monosodium glutamate.

References Cited

UNITED STATES PATENTS

| | | | |
|---|---|---|---|
| 2,162,729 | 6/1939 | Levinson et al. | 99—2 |
| 3,014,800 | 12/1961 | Guidarelli | 99—2 |
| 3,343,963 | 9/1967 | Kjelson | 99—14 |
| 3,346,390 | 10/1967 | Pichel et al. | 99—98 |

RAYMOND N. JONES, Primary Examiner

J. R. HOFFMAN, Assistant Examiner

U.S. Cl. X.R.

99—98